US011764442B2

(12) United States Patent
Kim et al.

(10) Patent No.: US 11,764,442 B2
(45) Date of Patent: Sep. 19, 2023

(54) SEPARATOR FOR RECHARGEABLE LITHIUM BATTERY AND RECHARGEABLE LITHIUM BATTERY INCLUDING THE SAME

(71) Applicant: Samsung SDI Co., Ltd., Yongin-si (KR)

(72) Inventors: Byung-Soo Kim, Suwon-si (KR); Jaehyun Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 166 days.

(21) Appl. No.: 17/229,732

(22) Filed: Apr. 13, 2021

(65) Prior Publication Data
US 2021/0328306 A1 Oct. 21, 2021

(30) Foreign Application Priority Data
Apr. 16, 2020 (KR) .................. 10-2020-0046182

(51) Int. Cl.
*H01M 50/446* (2021.01)
*H01M 50/449* (2021.01)
(Continued)

(52) U.S. Cl.
CPC ........ *H01M 50/446* (2021.01); *C09D 183/16* (2013.01); *H01M 10/0525* (2013.01);
(Continued)

(58) Field of Classification Search
CPC ............. H01M 50/446; H01M 50/423; H01M 50/449; H01M 50/434; C08K 3/22; C08K 2003/2227; C09D 183/16
See application file for complete search history.

(56) References Cited

U.S. PATENT DOCUMENTS 7,662,517 B2 2/2010 Lee et al.
2017/0338461 A1* 11/2017 Seo .................... H01M 50/446
2018/0205112 A1* 7/2018 Thomas-Alyea ... H01M 4/0404

FOREIGN PATENT DOCUMENTS

JP          2004-14127 A    1/2004
KR    10-2006-0072065 A    6/2006
(Continued)

OTHER PUBLICATIONS

Korean Office Action dated Jun. 16, 2023, for corresponding Application No. 10-2020-0046182, 5 pages.

*Primary Examiner* — Christopher P Domone
*Assistant Examiner* — Jonathan William Estes
(74) *Attorney, Agent, or Firm* — Lewis Roca Rothgerber Christie LLP

(57) ABSTRACT

A separator for a rechargeable lithium battery includes a porous substrate; and a coating layer on at least one surface of the porous substrate, wherein the coating layer is formed from a coating layer composition including an organosilazane compound, inorganic particles, an initiator, and a solvent, the coating layer includes a curable binder of the organosilazane compound and inorganic particles, the curable binder of the organosilazane compound includes a copolymer including a structural unit represented by Chemical Formula 1, a structural unit represented by Chemical Formula 2, and a structural unit represented by Chemical Formula 3, and a nitrogen (N) atom derived from Chemical Formula 1 is greater than about 0 at % and less than about 5 at % (atomic percent) in the coating layer, and a rechargeable lithium battery. Chemical Formula 1 to Chemical Formula 3 are as defined in the specification.

10 Claims, 2 Drawing Sheets

(51) Int. Cl.
    *H01M 10/0525*    (2010.01)
    *H01M 50/434*     (2021.01)
    *H01M 50/423*     (2021.01)
    *C08K 3/22*        (2006.01)
    *C09D 183/16*     (2006.01)

(52) U.S. Cl.
    CPC ....... *H01M 50/423* (2021.01); *H01M 50/434* (2021.01); *H01M 50/449* (2021.01); *C08K 3/22* (2013.01); *C08K 2003/2227* (2013.01)

(56) References Cited

FOREIGN PATENT DOCUMENTS

| | | |
|---|---|---|
| KR | 10-2007-0000231 A | 1/2007 |
| KR | 10-2010-0072825 A | 7/2010 |
| KR | 10-2016-0071539 A | 6/2016 |
| KR | 2016071539 A * | 6/2016 |
| KR | 10-2017-0129640 A | 11/2017 |

\* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2020-0046182, filed in the Korean Intellectual Property Office on Apr. 16, 2020, the entire content of which is incorporated herein by reference.

BACKGROUND

1. Field

A separator for a rechargeable lithium battery and a rechargeable lithium battery including the same are disclosed.

2. Description of the Related Art

Recently, research on a rechargeable lithium battery has been actively made, as the demand for a battery having high energy density as a power source for a portable electronic device has increased. In addition, because of the increasing interest in utilizing an electric vehicle and/or the like to address environmental problems, research on the rechargeable lithium battery as a power source for the electric vehicle has been actively made.

The rechargeable lithium battery includes a positive electrode, a negative electrode, and a separator between the positive and negative electrodes. The separator plays a role of electrically insulating the positive and negative electrodes. In addition, the separator includes micropores through which lithium ions move.

There has been a constant demand for the separator to provide robust (e.g., excellent) battery heat stability, as the battery veers (e.g., tends) toward being lighter in-weight and down-sized, and there is a constant demand for the battery to have a high capacity as a power source having high power and large capacity for the electric vehicle.

For this kind of batteries, a separator formed by coating a binder resin and a ceramic particle on a porous substrate is mainly utilized. However, this kind of separator may rarely have satisfactory heat stability due to shrinkage during overheating of the battery.

SUMMARY

An aspect according to embodiments is directed toward a separator for a rechargeable lithium battery having suitable (e.g., ensured) heat resistance and adherence at the same time.

Another aspect according to embodiments is directed toward a rechargeable lithium battery including the separator.

According to an embodiment, a separator for a rechargeable lithium battery includes a porous substrate; and a coating layer on at least one surface of the porous substrate, wherein the coating layer is formed from a coating layer composition including an organosilazane compound, inorganic particles, an initiator, and a solvent, the coating layer includes the inorganic particles and a curable binder of the organosilazane compound (i.e., a binder formed from curing the organosilazane compound), the curable binder includes a copolymer including a structural unit represented by Chemical Formula 1, a structural unit represented by Chemical Formula 2, and a structural unit represented by Chemical Formula 3, and a nitrogen (N) atom derived from Chemical Formula 1 is greater than about 0 at % and less than about 5 at % (atomic percent) in amount based on a total atomic amount in the coating layer.

According to another embodiment, a rechargeable lithium battery includes the separator for a rechargeable lithium battery.

Due to the separator for the rechargeable lithium battery having high (e.g., excellent) adherence and high heat resistance, the rechargeable lithium battery having high (e.g., excellent) thermal safety and desired (e.g., excellent) coating appearance may be implemented (e.g., obtained).

DETAILED DESCRIPTION

Figure 1:
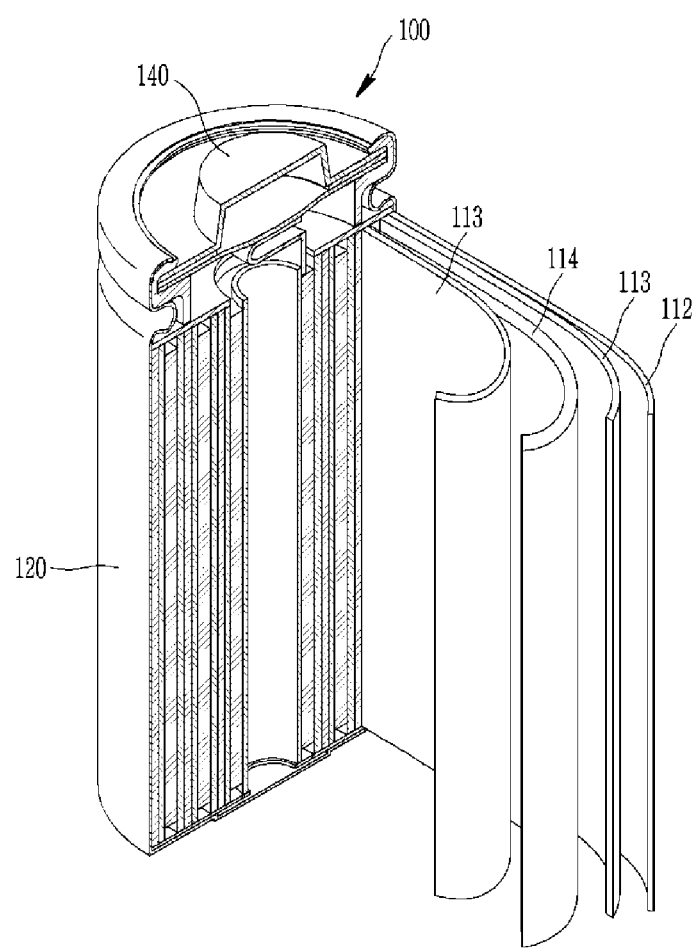
FIG. 1 is an exploded perspective view of a rechargeable lithium battery according to an embodiment.

Hereinafter, embodiments of the present disclosure will be described in more detail. However, these embodiments are examples, the present disclosure is not limited thereto and the subject matter of the present disclosure is defined by the scope of claims, and equivalents thereof.

As used herein, when a definition is not otherwise provided, the term "substituted" refers to that a hydrogen atom in a compound is replaced by a substituent other than hydrogen.

In some embodiments, the term "substituted" refers to replacement of a hydrogen atom of a compound by a substituent selected from, for example, a halogen atom (F, Br, Cl, and/or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, the term "hetero" refers to a group including 1 to 3 heteroatoms selected from N, O, S, and P.

As used herein, the term "(meth)acryl" refers to acryl and/or methacryl.

As used herein, when a definition is not otherwise provided, the term "combination thereof" refers to a mixture, a copolymer, a blend, an alloy, a composite, and/or a reaction product of components.

Hereinafter, a separator for a rechargeable battery according to an embodiment is described.

The separator for a rechargeable lithium battery according to the present embodiment separates a negative electrode and a positive electrode and provides a transporting passage for lithium ions. The separator includes a porous substrate and a coating layer on at least one surface of the porous substrate.

The porous substrate may be a substrate including pores, and lithium ions may move through the pores. The porous substrate may be (e.g., formed of), for example, polyolefin, polyester, polytetrafluoroethylene (PTFE), polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylene sulfide, polyethylenenaphthalene, a glass fiber, or a combination thereof, but the present disclosure is not limited thereto. Non-limiting examples of the polyolefin may be polyethylene, polypropylene, and/or the like, and non-limiting examples of the polyester may be polyethyleneterephthalate, polybutyleneterephthalate, and/or the like. In addition, the porous substrate may be a non-woven fabric or a woven fabric. The porous substrate may have a single layer or a multilayer structure. For example, the porous substrate may be a polyethylene single layer, a polypropylene single layer, a polyethylene/polypropylene double layer, a polypropylene/polyethylene/polypropylene triple layer, a polyethylene/polypropylene/polyethylene triple layer, and/or the like. A thickness of the porous substrate may be about 1 μm to about 40 μm, for example, about 1 μm to about 30 μm, about 1 μm to about 20 μm, about 5 μm to about 20 μm, or about 5 μm to about 10 μm. When the thickness of the substrate is within these ranges, short-circuit between positive and negative electrodes may be prevented or substantially prevented without increasing internal resistance of a battery.

The coating layer is formed from a coating layer composition including an organosilazane compound, inorganic particles (e.g., a plurality of inorganic particles), an initiator, and a solvent, formed on one surface or both surfaces of the porous substrate, and may include a curable binder of the organosilazane compound (i.e., a binder formed from curing the organosilazane compound) and the inorganic particles.

The curable binder of the organosilazane binder (i.e., the binder formed from curing the organosilazane compound) may include a copolymer including a structural unit represented by Chemical Formula 1, a structural unit represented by Chemical Formula 2, and a structural unit represented by Chemical Formula 3.

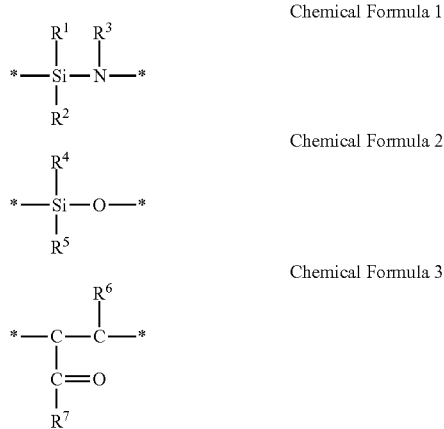

Chemical Formula 1

Chemical Formula 2

Chemical Formula 3

In Chemical Formula 1 to Chemical Formula 3, $R^1$ to $R^6$ are each independently hydrogen, a substituted or unsubstituted C1 to C30 alkyl group, a substituted or unsubstituted C3 to C30 cycloalkyl group, a substituted or unsubstituted C2 to C30 alkoxy group, a substituted or unsubstituted C3 to C30 heterocycloalkyl group, a substituted or unsubstituted C3 to C30 alkenyl group, a substituted or unsubstituted C3 to C30 aryl group, or a combination thereof, and $R^7$ is a substituted or unsubstituted C1 to C30 alkyl group.

A nitrogen (N) atom derived from Chemical Formula 1 is included in an amount of greater than about 0 at % and less than about 5 at % (atomic percent) in the coating layer. For example, the amount of nitrogen atoms derived from Chemical Formula 1 is greater than about 0 at % and less than about 5 at % in amount based on a total atomic amount of the coating layer.

The atomic percent of nitrogen (N) is a measure of the amount of nitrogen contained in the coating layer by Auger Electron Spectroscopy (AES).

Even after curing, because a small amount of the silazane moiety (Si—N) is included in the coating layer, flexibility of the coating layer may be maintained, and thus, excellent appearance characteristics of the coating layer may be implemented (e.g., obtained).

The binder may include a structural unit represented by Chemical Formula 2 including a siloxane moiety (Si—O) in addition to the structural unit represented by Chemical Formula 1 including a silazane moiety (Si—N) in the structure.

The siloxane moiety is derived from the silazane moiety, and the silazane moiety is converted into a siloxane moiety while the silazane moiety is cured.

An oxygen (O) atom derived from Chemical Formula 2 may be included in an amount greater than 0% and less than 5% (atomic percent) in the coating layer. That is, the amount of oxygen atoms derived from Chemical Formula 2 is greater than about 0 at % and less than about 5 at % based on a total atomic amount of the coating layer.

The oxygen (O) atomic concentration is measured by the same method as the nitrogen (N) atomic concentration.

When oxygen derived from the siloxane moiety (Si—O) represented by Chemical Formula 2 is included in the above range, shrinkage during heat treatment may be prevented or reduced.

The curable binder of the organosilazane compound (i.e., the binder formed from curing the organosilazane compound) may include a copolymer including greater than about 0 mol % and less than about 10 mol % of the structural unit represented by Chemical Formula 1, and greater than about 0 mol % and less than about 5 mol % of the structural unit represented by Chemical Formula 2, and about 90 mol % to about 99 mol % of the structural unit represented by Chemical Formula 3.

When the contents of the structural unit represented by Chemical Formula 1 and the structural unit represented by Chemical Formula 2 are as described above, improved heat resistance and desired (e.g., excellent) appearance characteristics of the coating layer may be concurrently or simultaneously implemented (e.g., obtained).

In this respect, the curable binder of the organosilazane (i.e., the binder formed from curing the organosilazane compound) may include a copolymer including greater than about 0 mol % and less than about 5 mol % of the structural unit represented by Chemical Formula 1, and greater than about 0 mol % and less than about 5 mol % of the structural unit represented by Chemical Formula 2.

In addition, the curable binder of the organosilazane (i.e., the binder formed from curing the organosilazane compound) may also function as a conventional binder by including the structural unit represented by Chemical Formula 3 derived from (meth)acrylate.

That is, by including the structural unit represented by Chemical Formula 3, a binding force between the substrate and the coating layer, and a binding force between the curable binder and inorganic particles may be secured.

In view of such adherence (e.g., binding force), the curable binder of the organosilazane (i.e., binder formed from curing the organosilazane compound may include a copolymer including the structural unit represented by Chemical Formula 3 in a ratio (e.g., a mole percentage) of about 95 mol % to about 99 mol % based on a total mole amount of the copolymer.

The term "curable binder" as used herein refers to a copolymer including structural units crosslinked by heat and/or light.

In an embodiment, the "curable binder" (i.e., "the binder formed from curing the organosilazane compound") may be formed by curing the organosilazane compound, and the organosilazane compound may be represented by Chemical Formula 4.

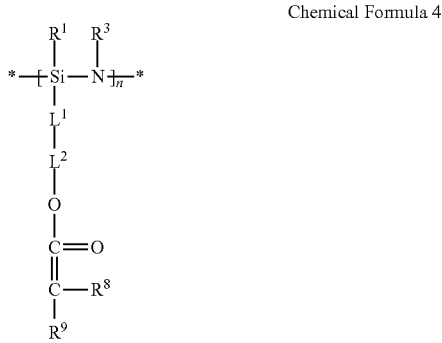

Chemical Formula 4

Figure 2:
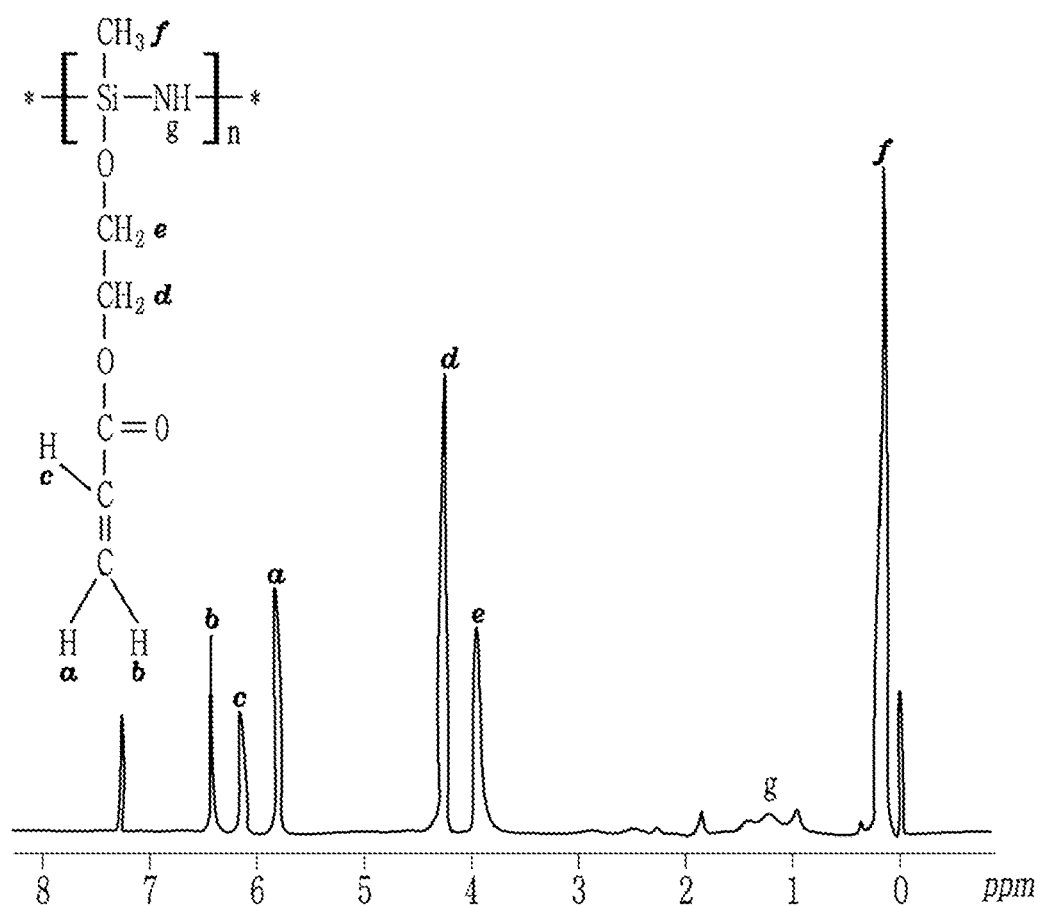
FIG. 2 shows an NMR spectrum of an organosilazane according to an embodiment.

In Chemical Formula 4, $R^1$, $R^3$, $R^8$, and $R^9$ are each independently hydrogen, a substituted or unsubstituted C1 to C30 alkyl group, a substituted or unsubstituted C3 to C30 cycloalkyl group, a substituted or unsubstituted C2 to C30 alkoxy group, a substituted or unsubstituted C3 to C30 heterocycloalkyl group, a substituted or unsubstituted C3 to C30 alkenyl group, a substituted or unsubstituted C3 to C30 aryl group, or a combination thereof, $L^1$ and $L^2$ are each independently a substituted or unsubstituted C1 to C30 alkylene group, and n is an integer. For example, n is an integer in a range from 2 to 20. FIG. 2 shows an NMR spectrum of an organosilazane compound according to an embodiment.

The silazane moiety (Si—N) in the organosilazane compound may be included in an amount of greater than about 0 mol % and less than or equal to about 10 mol % based on a total amount (e.g., total mole amount) of the organosilazane compound.

When the amount of the silazane moiety in the organosilazane compound is as described above, appropriate heat resistance and adherence may be secured when a cured binder is formed.

A weight average molecular weight of the organosilazane compound may be about 2,000 g/mol to about 15,000 g/mol, for example, about 10,000 g/mol to about 15,000 g/mol.

When the weight average molecular weight of the organosilazane compound is within the above ranges, a dense coating layer may be formed while reducing components that evaporate during heat treatment. That is, when the weight average molecular weight of the organosilazane compound is within the above ranges, a dense coating layer may be formed while the amount of volatile components that may evaporate during heat treatment may be reduced.

The coating layer may be formed by curing with irradiation of ultraviolet rays at a light amount (e.g., at an intensity) of about 100 mJ/cm² to about 10,000 mJ/cm² per surface (e.g., on each surface) of the substrate, and according to an embodiment, the light amount may be about 100 mJ/cm² to about 1,000 mJ/cm², for example, about 100 mJ/cm² to about 500 mJ/cm².

When the amount of light irradiation is as described above, the ratio of the siloxane moiety and the silazane moiety may be suitably adjusted to prepare a separation membrane (e.g., separator) having suitable physical properties (e.g., according to an example embodiment).

The inorganic particles may be $Al_2O_3$, $B_2O_3$, $Ga_2O_3$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but the present disclosure is not limited thereto.

The inorganic particles may have an average particle diameter in a range from about 1 nm to about 2000 nm, for example, about 100 nm to about 1000 nm, or about 100 nm to about 700 nm. Further, two or more kinds (e.g., types) of inorganic particles having different particle diameters may be mixed and utilized. When the inorganic particles have an average particle diameter within these ranges, the coating layer may be uniformly coated on the substrate and a short circuit between the positive and negative electrodes may be suppressed. In addition, resistance of lithium ions may be reduced or minimized to secure performance of a rechargeable lithium battery.

In the present specification, the average particle diameter may be a particle size ($D_{50}$) at 50% by volume in a cumulative size-distribution curve.

A thickness of the coating layer may be about 1 μm to about 20 μm, for example, about 1 μm to about 10 μm, or about 1 μm to about 5 μm. When the thickness of the coating layer is within the above ranges, heat resistance is excellent, so that a short circuit inside the battery may be suppressed, a stable separator may be secured (e.g., provided), and an increase in internal resistance of the battery may be suppressed.

The separator for a rechargeable lithium battery according to an embodiment may be manufactured by various suitable (e.g., known) methods. For example, a separator for a rechargeable lithium battery may be formed by coating the coating layer composition to one or both surfaces of a porous substrate and then drying (e.g., the coating layer composition).

The coating layer composition may include an organosilazane compound, inorganic particles, an initiator, and a solvent.

Here, the coating layer composition including the organosilazane compound, inorganic particles, initiator, and solvent may be coated on at least one surface of a substrate.

The organosilazane compound may be included in an amount of about 1 wt % to about 10 wt %, for example, about 2 wt % to about 8 wt %, based on a total weight of the coating layer, specifically, a total weight of the organosilazane compound, the inorganic particles, and the initiator.

The inorganic particles may be included in an amount of about 90 wt % to about 98 wt %, for example, about 92 wt % to about 97 wt %, based on the total weight of the coating layer (e.g., a total weight of the organosilazane compound, the inorganic particles, and the initiator). When the inorganic particles are included within the above ranges, battery performance may be improved by reducing or preventing contraction of the substrate due to heat and suppressing a short circuit between the positive and negative electrodes.

The coating layer composition may further include a dispersing agent.

By further including a dispersing agent, compatibility between the organosilazane compound and inorganic particles in the coating layer composition is increased, and thus a uniform coating layer may be formed, so that the binding force for a substrate of the separator may be further improved.

According to an embodiment, the dispersing agent may be included in an amount of about 0.1 wt % to about 3 wt %, for example about 0.1 wt % to about 2 wt %, or about 0.1 wt % to about 1 wt %, based on a total weight of the organosilazane compound, the inorganic particles, and the initiator.

When the amount of the dispersing agent is within the above ranges, the inorganic material is evenly dispersed, so that the surface roughness of the coating layer may be reduced and the coating layer may be flat.

In an embodiment, the coating layer composition may be prepared by mixing a polymer solution including organosilazane and an inorganic dispersion including inorganic particles, and then adding an initiator and stirring at about 10° C. to about 40° C. for about 30 minutes to about 5 hours. At this time, the organosilazane compound and the inorganic particles are mixed in a weight ratio of about 4:6 to about 1:9 based on the solid content, and the initiator is mixed in an amount of about 0.1 wt % to about 10 wt %, for example, about 0.1 wt % to about 5 wt %, based on the total weight of the coating layer (e.g., the total weight of the organosilazane compound, the inorganic particles, and the initiator).

The solvent may include alcohols such as methanol, ethanol, isopropylalcohol, and/or the like; ketones such as acetone and/or the like; and/or water, and/or the like; but the solvent is not particular limited as long as it suitably dissolves the organosilazane.

The initiator may be a photoinitiator, a thermal initiator, or a combination thereof.

The photoinitiator may be utilized when curing by photopolymerization utilizing ultraviolet rays and/or the like. Non-limiting examples of the photoinitiator may include acetophenones such as diethoxyacetophenone, 2-hydroxy-2-methyl-1-phenylpropan-1-one, benzyldimethylketal, 1-hydroxycyclohexyl-phenylketone, 2-methyl-2-morpoline (4-thiomethylphenyl)propan-1-one, and/or the like; benzoin ethers such as benzoinmethylether, benzoinethylether, benzoinisopropylether, benzoinisobutylether, and/or the like; benzophenones such as benzophenone, o-benzoyl methyl benzoate, 4-phenylbenzophenone, 4-benzoyl-4'-methyldiphenylsulfurous acid, 4-benzoyl-N,N-dimethyl-N-[2-(1-oxo-2-propenyloxy)ethyl] benzene metanaminium bromide, (4-benzoylbenzyl)trimethylammoniumchloride, and/or the like; thioxanthones such as 2,4-diethylthioxanthone, 1-chloro-4-dichlorothioxanthone, and/or the like; and/or 2,4,6-trimethylbenzoyldiphenylbenzoyloxide, and/or the like. These may be utilized alone or as a mixture of two or more.

The thermal initiator may be utilized when curing by thermal polymerization. As the thermal initiator, organic peroxide free radical initiators such as diacyl peroxides, peroxy ketals, ketone peroxides, hydroperoxides, dialkyl peroxides, peroxy esters, and/or peroxy dicarbonates may be utilized. For example, lauroyl peroxide, benzoyl peroxide, cyclohexanone peroxide, 1,1-bis(t-butylperoxy)-3,3,5-trimethylcyclohexane, t-butylhydroperoxide, and/or the like may be utilized alone or in combination of two or more.

The stirring may be performed with a ball mill, a beads mill, a screw mixer, and/or the like.

The coating layer composition may be coated on the substrate utilizing a method of dip coating, die coating, roll coating, comma coating, and/or the like, but the present disclosure is not limited thereto.

In addition, after coating the coating layer composition, a drying process may be further performed. The drying process may be performed at a temperature of about 80° C. to about 100° C. for about 5 seconds to about 60 seconds, and may utilize batch or continuous drying.

Then, the coated coating composition may be cured to form a coating layer.

The curing may be performed by photocuring, thermal curing, or a combination thereof. The photocuring conditions are as described above. In addition, the thermal curing may be performed at a temperature of about 60° C. to about 120° C. for about 1 hour to about 36 hours, for example, at a temperature of about 80° C. to about 100° C. for about 10 hours to about 24 hours.

The formation of the coating layer on the substrate may be performed by a method such as lamination or coextrusion in addition to the coating method utilizing the coating layer composition.

Hereinafter, a rechargeable lithium battery including the separator for the rechargeable lithium battery is described.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and/or the like, depending on the shape. In addition, it may include a bulk type and a thin film type, depending on sizes. Structures and manufacturing methods for these batteries should be well known in the art pertaining to this disclosure.

Herein, as an example of a rechargeable lithium battery, a cylindrical rechargeable lithium battery is described as an example. FIG. 1 is an exploded perspective view of a rechargeable lithium battery according to an embodiment. Referring to FIG. 1, a rechargeable lithium battery 100 according to one embodiment includes a battery cell including a negative electrode 112, a positive electrode 114 facing the negative electrode 112, a separator 113 between the negative electrode 112 and the positive electrode 114, and an electrolyte impregnating the negative electrode 112, the positive electrode 114 and the separator 113, and a battery container 120 (e.g., a battery case containing the battery cell), and a sealing member 140 that seals the container 120.

The positive electrode 114 may include a positive current collector and a positive active material layer formed on the positive current collector. The positive active material layer includes a positive active material, a binder, and optionally a conductive material.

The positive current collector may utilize aluminum (Al), nickel (Ni), and/or the like, but the present disclosure is not limited thereto.

The positive active material may utilize a compound capable of intercalating and deintercalating lithium. In some embodiments, lithium and at least one of a composite oxide or a composite phosphate of a metal selected from cobalt, manganese, nickel, aluminum, iron, or a combination thereof may be utilized. For example, the positive active material may utilize lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Non-limiting examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the present disclosure is not limited thereto. These binders may be utilized alone or as a mixture of two or more.

The conductive material improves conductivity of an electrode. Non-limiting examples thereof may be natural graphite, artificial graphite, carbon black, a carbon fiber, a metal powder, a metal fiber, and/or the like, but the present disclosure is not limited thereto. These conductive materials may be utilized alone or as a mixture of two or more. The metal powder and the metal fiber may utilize a metal of copper, nickel, aluminum, silver, and/or the like.

The negative electrode 112 includes a negative current collector and a negative active material layer formed on the negative current collector.

The negative current collector may utilize copper, gold, nickel, or a copper alloy, but the present disclosure is not limited thereto.

The negative active material layer may include a negative active material, a binder and optionally a conductive material. The negative active material may be a material that reversibly intercalates/deintercalates lithium ions, and may include a lithium metal, a lithium metal alloy, a material capable of doping and dedoping lithium, a transition metal oxide, or a combination thereof.

Non-limiting examples of the crystalline carbon may be graphite such as amorphous, sheet-shaped, flake-shaped, spherical shaped or fiber-shaped natural graphite or artificial graphite. Non-limiting examples of the amorphous carbon may be soft carbon or hard carbon, a mesophase pitch carbonized product, fired coke, and/or the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ (0<x<2), a Si—C composite, a Si—Y alloy, Sn, $SnO_2$, a Sn—C composite, a Sn—Y alloy, and/or the like, and at least one of these may be mixed with $SiO_2$. Non-limiting examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and/or the like.

The binder and the conductive material utilized in the negative electrode 112 may be the same as the binder and conductive material of the positive electrode 114.

The positive electrode 114 and the negative electrode 112 may be manufactured by mixing a respective active material composition including a respective active material and a binder, and optionally a conductive material in a solvent, and coating the active material composition on a respective current collector. Herein, the solvent may be N-methylpyrrolidone, and/or the like, but the present disclosure is not limited thereto. The electrode manufacturing method is well known, and thus is not described in more detail in the present specification.

The electrolyte includes an organic solvent and a lithium salt.

The organic solvent serves as a medium for transmitting ions taking part in the electrochemical reaction of a battery. Non-limiting examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and/or the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and/or the like. The ether-based solvent may be dibutyl ether, tetraglyme, diglyme, dimethoxyethane, 2-methyltetrahydrofuran, tetrahydrofuran, and/or the like, and the ketone-based solvent may be cyclohexanone, and/or the like. The alcohol-based solvent may be ethanol, isopropyl alcohol, and/or the like. The aprotic solvent may be nitriles such as R—CN (R is a C2 to C20 linear, branched, or cyclic hydrocarbon group, a double bond, an aromatic ring, or an ether bond), and/or the like; amides such as dimethyl formamide, and/or the like; dioxolanes such as 1,3-dioxolane; and/or sulfolanes, and/or the like.

The organic solvent may be utilized alone or in a mixture of two or more, and when the organic solvent is utilized in a mixture of two or more, the mixture ratio may be controlled in accordance with a desirable cell performance.

The lithium salt is dissolved in an organic solvent, supplies lithium ions in a battery, enables the basic operation of the rechargeable lithium battery, and improves lithium ion transportation between the positive and negative electrodes therein. Non-limiting examples of the lithium salt may include two or more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ ((lithium bis(fluorosulfonyl)imide, LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer of 1 to 20), LiCl, LiI, and $LiB(C_2O_4)_2$ (lithium bis(oxalato) borate, and/or LiBOB), but the present disclosure is not limited thereto.

The lithium salt may be utilized in a concentration in a range from about 0.1 M to about 2.0 M. When the lithium salt is included within the above concentration range, an electrolyte may have excellent performance and lithium ion mobility due to suitable (e.g., optimal) electrolyte conductivity and viscosity.

Hereinafter, the above aspects of the present disclosure are illustrated in more detail with reference to examples. However, these are examples, and the present disclosure is not limited thereto.

PREPARATION OF SEPARATORS

Example 1

(Preparation of Coating Layer Composition)
Organosilazane (HU2015, DNF) was diluted into 30 wt % by utilizing acetone and then, stirred at 25° C. for 1 hour with a stirrer to prepare a polymer solution.

In addition, alumina ($Al_2O_3$, Nippon Light Metal Co., Ltd., Japan) was pulverized with a beadmill after adding a dispersing agent thereto, and then, 30 wt % of the pulverized alumina was mixed with 70 wt % of acetone at 40° C. for 4 hours to obtain an inorganic dispersion.

The polymer solution was mixed with the alumina dispersion to have a weight ratio of organosilazane:alumina=2.9:97, and 0.1 wt % of a photopolymerization initiator, Irgacure-184 (Ciba Specialty Chemicals Inc.), based on a total amount of the coating layer composition was added thereto and then, stirred with a power mixer at 25° C. for 1 hour to prepare a coating layer composition.

The coating layer composition was coated to be 12 μm thick on one surface of a polyethylene single film in a dip coating method and then, dried at 80° C. for 2 minutes and cured by radiating ultraviolet (UV) with 400 mJ/cm² by utilizing a high pressure mercury lamp to manufacture a 15 μm thick separator having a 3 μm thick coating layer.

Example 2

A coating layer composition was prepared according to the same method as Example 1 except that the polymer solution and the alumina dispersion were mixed in a weight ratio of organosilazane:alumina=7.7:92, and the photopolymerization initiator, Irgacure-184 (Ciba Specialty Chemicals Inc.), was added thereto in an amount of 0.3 wt % based on the total amount of the coating layer composition and then, stirred with a power mixer at 25° C. for 1 hour.

Comparative Example 1

A coating layer composition was prepared according to the same method as Example 1 except that polysilazane (molecular weight: 3,000 to 10,000, KL02 made by DNF) was diluted into 30 wt % by utilizing acetone.

Comparative Example 2

A coating layer composition was prepared according to the same method as Example 1 except that a multi-functional acrylate monomer (SK Cytec, DPHA) was diluted into 30 wt % by utilizing acetone.

Comparative Example 3

A coating layer composition was prepared according to the same method as Example 2 except that a multi-functional acrylate monomer (SK Cytec, DPHA) was diluted into 30 wt % by utilizing acetone.

The coating layer compositions according to the examples and the comparative Examples were prepared and their compositions are shown in Table 1.

TABLE 1

| | Organo-silazane (10 mol % or less) | Poly-silazane (100%) | Acrylate | Alumina | Photo-initiator |
|---|---|---|---|---|---|
| Example 1 | 2.9 | — | — | 97 | 0.1 |
| Example 2 | 7.7 | — | — | 92 | 0.3 |
| Comparative Example 1 | — | 2.9 | — | 97 | 0.1 |
| Comparative Example 2 | — | — | 2.9 | 97 | 0.1 |
| Comparative Example 3 | — | — | 7.7 | 92 | 0.3 |

EVALUATION EXAMPLES

Evaluation Example 1: Evaluation of Coating Layer Appearance

Uniformity of each of the coating layers was evaluated with the naked eyes, and foreign matters or other appearance defects, etc., thereof were examined through an in-line defect test.

Evaluation Example 2: Air Permeability

The amount of time (seconds) that took for each of the separators for a rechargeable battery according to Examples 1 and 2 and Comparative Examples 1 to 3 to pass 100 cc of air was measured by utilizing a permeability measuring device (Asahi Seiko Co., Ltd., EG01-55-1MR), and the results are shown in Table 2.

Evaluation Example 3: Binding Force for Substrate

The separators of Examples 1 and 2 and Comparative Examples 1 to 3 were cut to each have a width of 12 mm and a length of 50 mm to obtain samples. After adhering a tape to the coating layer surface of each sample and detaching it about 10 mm to 20 mm from the substrate, the side of the substrate to which the tape was not adhered was fixed into an upper grip, while the side of the coating layer to which the tape was adhered was fixed into the lower grip, with an interval (e.g., a distance) between the two grips of 20 mm and then, elongated and peeled off in a direction of 180°. Herein, the peeling speed was 10 mm/min, and a force required to peel 20 mm after starting the peeling was measured three times and averaged. The peel strength measurement results are shown in Table 2.

Evaluation Example 4: Evaluation of Film Resistance

Film resistance was measured for each of the separators prepared in Examples 1 and 2 and Comparative Examples 1 to 3, and the results are shown in Table 2.

Here, the film resistance may be measured by the following method. Each separator is placed between two stainless steel electrodes, and a 2032 coin cell filled with electrolyte is manufactured to measure AC impedance. Through this, the film resistance of the separator was measured.

Evaluation Example 5: Evaluation of Heat Resistance

The separators of Examples 1 and 2 and Comparative Examples 1 to 3 were each evaluated with respect to heat resistance by measuring a shrinkage rate against heat utilizing the following method, and the results are shown in Table 2.

Each sample of the separators was cut into a size of 10 cm×10 cm and allowed to stand in a convection oven set at 130° C. to 150° C. for 60 minutes to measure the shrinkage rate in each of MD (machine direction) and TD (vertical direction), and then calculate the average value. The average values are shown in Table 2. The shrinkage rate was calculated according to Equation 1.

Shrinkage rate (%)=[($L0-L1$)/$L0$]×100    Equation 1

In Equation 1, L0 denotes an initial length of a separator (e.g., in MD or in TD), and L1 denotes a length of the separator after being allowed to stand at 130° C. (or 150° C.) for 60 minutes.

TABLE 2

|  |  | Ex. 1 | Ex. 2 | Comp. Ex. 1 | Comp. Ex. 2 | Comp. Ex. 3 |
|---|---|---|---|---|---|---|
| Properties | Coating thickness (μm) | 3 | 3 | 3 | 3 | 3 |
|  | Coating appearance | good | good | Inferior | good | inferior |
|  | Air permeability (sec/100 cc) | 135 | 147 | Unmeasurable | 151 | 177 |
|  | Binding force for substrate (N/12 mm) | 1.41 | 1.57 | Unmeasurable | 0.41 | 0.09 |
|  | Film resistance (Ω) | 0.66 | 0.75 | Unmeasurable | 0.77 | 0.91 |
|  | Shrinkage rate (%) 130° C./1 hr | 1 | 1 | Unmeasurable | 12 | 16 |
|  | 150° C./1 hr | 2 | 3 | Unmeasurable | >60 | >60 |
| Remarks |  |  |  | peeling-off of coating layer |  | peeling-off of coating layer |

Referring to Table 2, the separators according to examples 1-2 each exhibited high (e.g., excellent) binding force for a substrate and heat resistance along with high (e.g., excellent) air permeability. In addition, each of the separators maintained low film resistance and thus realized high ion conductivity.

On the contrary, the separator of Comparative Example 1 including a coating layer formed by curing a polysilazane compound including silazane alone (without a moiety derived from an organic group including $SiO_2$) in the binder and thus did not work well as a separator (e.g., did not have suitable properties for a separator).

In addition, as in Comparative Examples 2 and 3, the separators including a coating layer formed of a moiety derived from an organic group such as acrylate without the silazane moiety and the siloxane moiety cured therefrom exhibited relatively deteriorated heat resistance and/or adherence compared with the examples.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." As used herein, the term "substantially," "about," and similar terms are used as terms of approximation and not as terms of degree, and are intended to account for the inherent deviations in measured or calculated values that would be recognized by those of ordinary skill in the art. Also, "about" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may refer to within one or more standard deviations, or within ±30%, 20%, 10%, 5% of the stated value.

Moreover, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims, and equivalents thereof.

DESCRIPTION OF SYMBOLS

100: rechargeable lithium battery
112: negative electrode
113: separator
114: positive electrode
120: battery case
140: sealing member

What is claimed is:

1. A separator for a rechargeable lithium battery, the separator comprising:
   a porous substrate; and
   a coating layer on at least one surface of the porous substrate,
   wherein the coating layer is formed from a coating layer composition comprising an organosilazane compound, inorganic particles, an initiator, and a solvent,
   the coating layer comprises the inorganic particles and a curable binder of the organosilazane compound,
   the curable binder of the organosilazane compound is represented by Chemical Formula 4, and
   a nitrogen (N) atom derived from Chemical Formula 4 is greater than about 0 at % and less than about 5 at % in amount based on a total atomic amount in the coating layer;

Chemical Formula 4

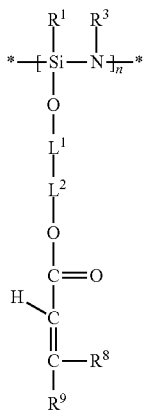

wherein, in Chemical Formula 4, $R^1$ $R^3$, $R^8$, and $R^9$ are each independently hydrogen, a substituted or unsubstituted C1 to C30 alkyl group, a substituted or unsubstituted C3 to C30 cycloalkyl group, a substituted or unsubstituted C2 to C30 alkoxy group, a substituted or unsubstituted C3 to C30 heterocycloalkyl group, a substituted or unsubstituted C3 to C30 alkenyl group, a substituted or unsubstituted C3 to C30 aryl group, or a combination thereof, $L^1$ and $L^2$ are each independently a substituted or unsubstituted C1 to C30 alkylene group, n is an integer, and

* represents a bonding site to a neighboring atom.

2. The separator of claim 1, wherein an oxygen (O) atom derived from the siloxane moiety (Si—O) of Chemical Formula 4 is greater than 0 at % and less than 5 at % in amount based on a total atomic amount in the coating layer.

3. The separator of claim 1, wherein the organosilazane compound is about 1 wt % to about 10 wt % in amount based on a total weight of the organosilazane compound, the inorganic particles, and the initiator.

4. The separator of claim 1, wherein
the silazane moiety (Si—N) in the organosilazane compound is greater than about 0 mol % and less than or equal to about 10 mol % based on a total mole amount of the organosilazane compound.

5. The separator of claim 1, wherein a weight average molecular weight of the organosilazane compound is about 2,000 g/mol to about 15,000 g/mol.

6. The separator of claim 1, wherein the inorganic particles are about 90 wt % to about 98 wt % in amount based on a total weight of the organosilazane compound, the inorganic particles, and the initiator.

7. The separator of claim 6, wherein the inorganic particles are selected from $Al_2O_3$, $B_2O_3$, $Ga_2O_3$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, and a combination thereof.

8. The separator of claim 1, wherein a thickness of the coating layer is about 1 μm to about 20 μm.

9. The separator of claim 1, wherein the coating layer is formed by curing the coating layer composition on the at least one surface of the porous substrate with irradiation of ultraviolet rays at about 100 mJ/cm² to about 10,000 mJ/cm² in intensity.

10. A rechargeable lithium battery, comprising:
a positive electrode;
a negative electrode; and
the separator of claim 1 between the positive electrode and the negative electrode.

* * * * *